United States Patent [19]
Motai et al.

[11] Patent Number: 5,644,493
[45] Date of Patent: Jul. 1, 1997

[54] PRODUCTION INFORMATION PROCESSING SYSTEM

[75] Inventors: Kazunori Motai; Kimio Inoue, both of Kanagawa, Japan

[73] Assignee: NSK Ltd., Tokyo, Japan

[21] Appl. No.: 395,812

[22] Filed: Feb. 28, 1995

Related U.S. Application Data

[63] Continuation-in-part of Ser. No. 936,217, Aug. 27, 1992, abandoned.

[30] Foreign Application Priority Data

Aug. 30, 1991 [JP] Japan ................... 3-220664

[51] Int. Cl.⁶ ............................................. G06F 19/00
[52] U.S. Cl. .................. 364/468.02; 364/468.03
[58] Field of Search ...................... 364/468, 400, 364/401, 550, 552, 468.01–468.28

[56] References Cited

U.S. PATENT DOCUMENTS

| | | | |
|---|---|---|---|
| 4,149,246 | 4/1979 | Goldman | 364/400 |
| 4,827,423 | 5/1989 | Beasley et al. | 364/131 X |
| 4,901,253 | 2/1990 | Iwano et al. | 364/550 X |
| 4,998,206 | 3/1991 | Jones et al. | 364/468 |
| 5,089,970 | 2/1992 | Lee et al. | 364/131 X |
| 5,208,765 | 5/1993 | Turnbull | 364/552 |

Primary Examiner—Paul P. Gordon
Assistant Examiner—Steven R. Garland
Attorney, Agent, or Firm—Sughrue, Mion, Zinn, Macpeak & Seas

[57] ABSTRACT

In a production information processing system in which all information including image data required for manufacturing products is properly transmitted to a producing spot to thereby make it possible to perform high quality control, a manufacturing drawing information is formed in a computer aided system portion in a main information processing apparatus, and a quality control instruction table is formed on the basis of the manufacturing drawing information in a quality control system portion, so that the amount of order reception, the data of delivery, and the like are entered in a production control system portion. Then, each information is transmitted to an engineering work station provided in a factory. In the engineering work station, a handwritten process instruction such as "factory know how" or the like is read in as image data; the quality control instruction table, the manufacture instruction table and the process instruction table are integrated so as to form an integrative work instruction table; the integrative work instruction table is sent to interactive type terminals provided in each spot.

5 Claims, 5 Drawing Sheets

QUALITY CONTROL INSTRUCTION TABLE 71

| CONTROL ITEMS | PROCESS STANDARDS |
|---|---|
| NUMBER OF ACCOMODATED | 77 |
| NUMBER OF BOXES | 40 |
| AMOUNT PER PALLET | 3080 |
| DIVISION OF PALLET | ○ ○ ○ |
| MARKING (A) | HR30307C |
| MARKING (B) | NONE |
| RUSTPREVENTION OIL | NO UNEVENNESS |
| QUANTITY OF OIL INSIDE A TANK | NOT SMALLER THAN 1/2 |
| TRAY AND GOODS DELIVERY BOX | NO WATER AND NO FOREIGN MATTER |
|  |  |
|  |  |
|  |  |

| INSPECTION PROCESS INSTRUCTION TABLE | NO. |
|---|---|
| B BODY INSPECTION | BTK10101 |
| ASSEMBLY | ASS10101 |
| COMPLETION INSPECTION | BKK10101 |
| COMPLETION INSPECTION 1 | AK110101 |
| COMPLETION INSPECTION 2 | AK210101 |

FIG. 4

MANUFACTURING INSTRUCTION TABLE 72

| NUMBER OF PRODUCTS | 4620 | NUMBER OF PALLET | 1 | NUMBER OF BOXES | 60 | NUMBER OF PRODUCTS PER BOX | 77 |
|---|---|---|---|---|---|---|---|
| DATE OF INSPECTION | 03-29 | END NUMBER | 1 | END NUMBER | | | |
| DATE OF DELIVERY | 04-25 | | | | | | |
| INSPECTION ROD NUMBER | NO. A101 903096 | | | | | | |
| NAME NUMBER | | | | | | | |

FIG. 5

PROCESS INSTRUCTION TABLE 73

74a

| ACCOMPDATING METHOD | | WEIGHT | FIGURE OF BAGGAGE |
|---|---|---|---|
| 11 (PRODUCTS) × 7 (LAYERS) | | 14.5kg | |
| WRAPPING MATERIAL | | NUMBER | |
| CASE | TRAY AND GOODS DELIVERY BOX | 1 | 74b |
| BAG | GAZETTE | 1 | |
| POST | B | 1 | |
| PAT | H | 3 | |
| TAPE | | 2 | |
| | | | |
| BLUE TAPE SHOULD BE USED. | | | |
| IN BAGGAGE FOR "A1", TAPE SHOULD BE APPLIED IN A CROSS-SHAPED FORM. | | | |

SPECIAL CONTROL ITEMS

FIG. 6   WRAPPING PROCESS INSTRUCTION

| NAME NUMBER | DESTINATION | ISSUE | SECTION 22 | ACKNOWLEDGEMENT | INSPECTION | DRAWING |
|---|---|---|---|---|---|---|
| HR30307C*A | Z | A1 | | AKIBA 89-03-25 | ISHII 89-03-25 | ISHIHARA 89-03-25 |

75 — INTEGRATIVE WORK INSTRUCTION TABLE

72

| CONTROL ITEMS | PROCESS STANDARDS |
|---|---|
| NUMBER OF THE ACCOMODATED | 77 |
| NUMBER OF BOXES | 40 |
| AMOUNT PER PALLET | 3080 |
| DIVISION OF PALLET | ○ ○ ○ |
| MARKING (A) | HR30307C |
| MARKING (B) | — |
| RUSTPREVENTION OIL | NO UNEVENNESS |
| QUANTITY OF OIL INSIDE A TANK | NOT SMALLER THAN 1/2 |
| TRAY AND GOODS DELIVERY BOX | NO WATER AND NO FOREIGN MATTER |

| NUMBER OF PRODUCTS | 4620 | NUMBER OF PALLET | 1 | NUMBER OF BOXES | 60 | NUMBER OF PRODUCTS PER BOX | 77 |
|---|---|---|---|---|---|---|---|
| DATE OF INSPECTION | 03-29 | END NUMBER | 1 | END NUMBER | | | |
| DATE OF DELIVERY | 04-25 | | | | | | |
| INSPECTION ROD NUMBER NAME NUMBER | A101 903096 | | | | | | |

| ACCOMODATING METHOD | | WEIGHT | NUMBER |
|---|---|---|---|
| 11 (PRODUCTS) × 7 (LAYERS) | | 14.5kg | |
| WRAPPING MATERIAL | TRAY AND GOODS DELIVERY BOX | | 1 |
| | CASE | | |
| | BAG GAZETTE | | 1 |
| | POST | | B |
| | PAT | | H |
| | TAPE | | 2 |

FIGURE OF BAGGAGE

FIGURE OF BAGGAGE NO.

| | BLUE TAPE SHOULD BE USED. |
|---|---|
| SPECIAL CONTROL ITEMS | IN BAGGAGE FOR "A1", TAPE SHOULD BE APPLIED IN A CROSS-SHAPED FORM. |

73

71

| INSPECTION PROCESS INSTRUCTION TABLE | NO. |
|---|---|
| B BODY INSPECTION | BTK10101 |
| ASSEMBLY | ASS10101 |
| COMPLETION INSPECTION | BKK10101 |
| COMPLETION INSPECTION 1 | AK110101 |
| COMPLETION INSPECTION 2 | AK210101 |

PRODUCTION INFORMATION PROCESSING SYSTEM

This is a continuation-in-part of application Ser. No. 07/936,217 filed Aug. 27, 1992 now abandoned.

BACKGROUND OF THE INVENTION

The present invention relates to a production information processing system in which manufacturing drawings and instruction information, for example, with respect to quality control, production control, process control, and the like, which are required in the case of manufacturing products are properly integrated so that the most suitable instruction information for a production line is displayed.

A production control system in which a character-type display is connected, as a terminal, to a host computer and character information is transferred between the host computer and the display so that various pieces of instruction information, for example, with respect to quality control, production control, process control, and the like, are transferred to a production line is well known.

In the foregoing conventional production information processing system, however, there has been a problem as follows. That is, various pieces of instruction information from the host computer are merely displayed in the terminal as character information, and various drawings such as manufacturing drawings, processing drawings, and the like, in a production line for products as well as a so-called manually-formed "know how on spot", which is also called a working procedure, formed by a worker, an overseer, or a manager are separately formatted in the form of sheets of media. Accordingly, it is difficult to timely deliver instructions in synchronism with a physical distribution of the products and therefore the products do not accord with the instruction information.

SUMMARY OF THE INVENTION

The present invention has been therefore accomplished in view of the foregoing problem in the prior art and an object of the present invention is to provide a production information processing system in which all the information such as manufacturing drawing data, various pieces of instruction information, a handwritten working procedure in a production line, and the like, are integrated with each other and the thus obtained integrated information is displayed in a display means provided in the production line in synchronism with a production process so that proper information transfer can be carried out to thereby make it possible to perform high-degree quality control.

In order to attain the foregoing object, the production information processing system according to the present invention is characterized by comprising: a manufacturing drawing information generation means for generating manufacturing drawing information of products; a quality control information instruction means for generating quality control instruction information on the basis of the manufacturing drawing information from the manufacturing drawing information generation means; a production control information generation means for generating production control information including for example the number of products; a production integrative information generation means supplied with the manufacturing drawing information from the manufacturing drawing information generation means, the quality control instruction information from the quality control information instruction means and the production control information from the production control information generation means for generating production integrative information further more adding process control instruction information including image data to the quality control instruction information; and a production integrative information send-out means for sending-out the production integrative information from the production integrative information generation means to an information output means provided in a production line.

According to the present invention, manufacturing drawing information for desired products is generated in the manufacturing drawing information generation means, and quality control information such as control items, process standards, inspection work instructions, and the like for products in each manufacturing process is generated, in the quality control information instruction means, on the basis of the manufacturing drawing information and in accordance with the process ability, the process setting, and the like of a factory. On the other hand, production control information such as the number of product orders received by customers, date of delivery of materials, and the like, is generated in the production control information generation means. Then, the manufacturing drawing information, the quality control information, and the production control information are sent to the production integrative information generation means, and process control instruction information including image data such as a working procedure which is a so-called "know how on spot" and the like are added to the supplied manufacturing drawing information, quality control information and production control information so that production integrative information is generated in the production integrative information generation means. Then, the production integrative information is sent to the information output means provided in the production line so that the most suitable instruction information corresponding to the product producing process is displayed or printed in the production line.

DETAILED DESCRIPTION OF THE PREFERRED EMBODIMENTS

Next, an embodiment of the present invention will be described with reference to the accompanying drawings.

Figure 2:
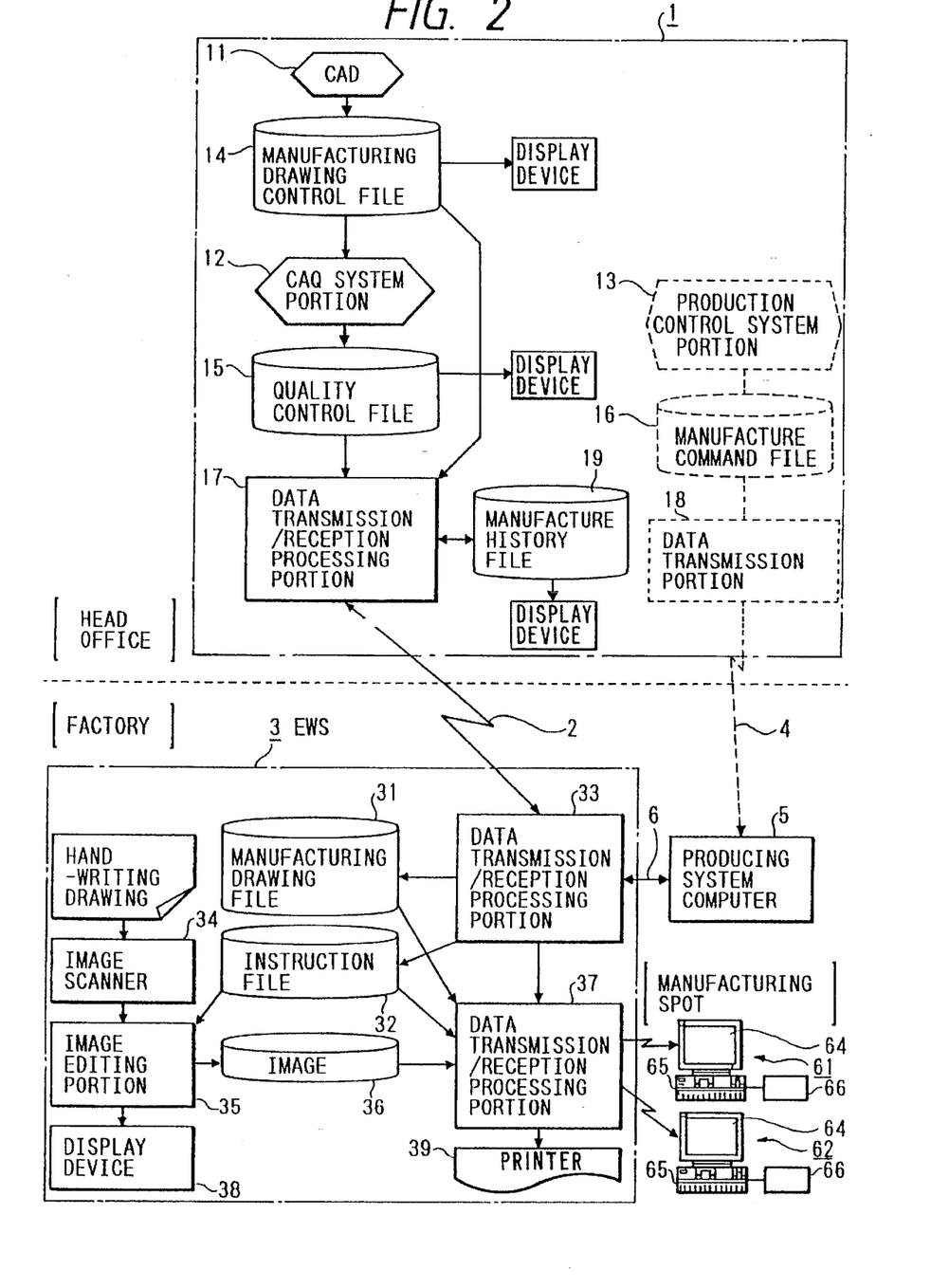
FIG. 2 is a system diagram showing an embodiment of the present invention.

FIG. 2 is a block diagram showing an embodiment in which the present invention is applied to the case of manufacturing rolling bearings.

Figure 1:
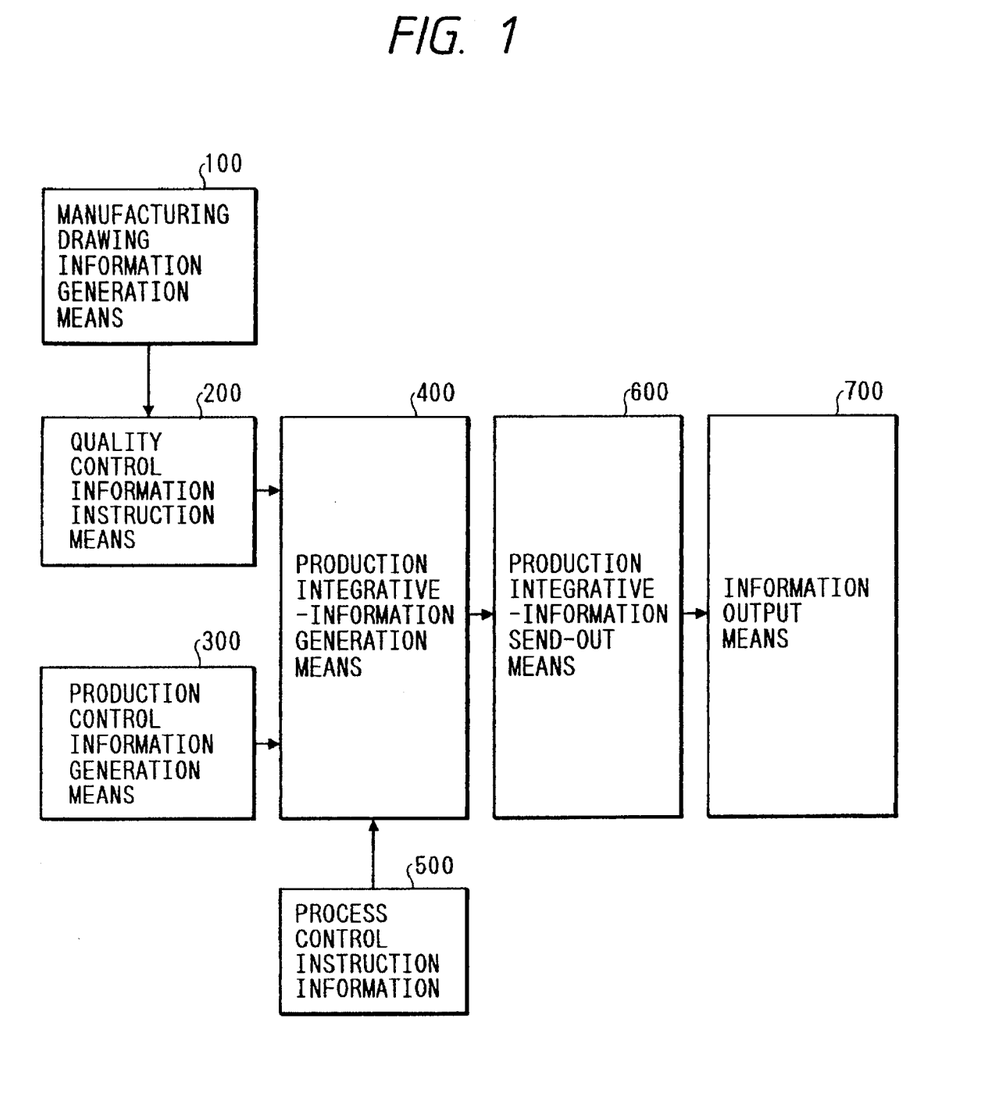
FIG. 1 is a diagram schematically showing the fundamental configuration of the present invention.

In the drawing, the reference numeral 1 designates a main information processing apparatus including, for example, a host computer provided in the head office of a manufacturing company, which is connected through a private high-speed digital communication line 2 to an engineering work station (hereinafter, refer red to as an EWS) 3 acting as the production integrative information generation means 400

(see FIG. 1) for integration-controlling a production line provided in a factory, and which is connected to a producing system computer 5 provided in the factory through a private high-speed digital communication line 4 in the same manner as the foregoing case, the producing system computer 5 being connected to the EWS 3 through an internal house line 6.

The main information processing apparatus 1 has a system portion 11 of computer aided design (CAD) acting as the manufacturing drawing information generation means 100 (see FIG. 1), another system portion 12 of a computer aided quality-control (CAQ) acting as the quality control information instruction means 200 (see FIG. 1), and a further system portion 13 of production control acting as the production control information generation means 300 (see FIG. 1).

Upon reception of selection conditions of the rolling bearing, the computer aided design system portion 11 sets the form and arrangement of the bearing on the basis of the received selection conditions; determines the size of the bearing on the basis of the machine to be used, the designed life, the allowable static load coefficient, and the like; investigates special use conditions of the bearing, for example, such as the accuracy, the clearance, the holder, the lubrication condition, the use temperature, the atmosphere, and the like to thereby determine the bearing number (hereinafter, referred to as the "name number") of the bearing; searches a data base stored in advance on the basis of the name number to read figure drawing data of the bearing corresponding to the name number; and displays the data in a display device such as a CRT display or the like. Manufacturing drawing data for the desired product can be generated by repetition of the foregoing operation and the thus generated manufacturing drawing data as well as the various conditions such as the selection conditions and the like are stored, as the manufacturing drawing information, into a manufacturing drawing control file 14.

Figure 3:
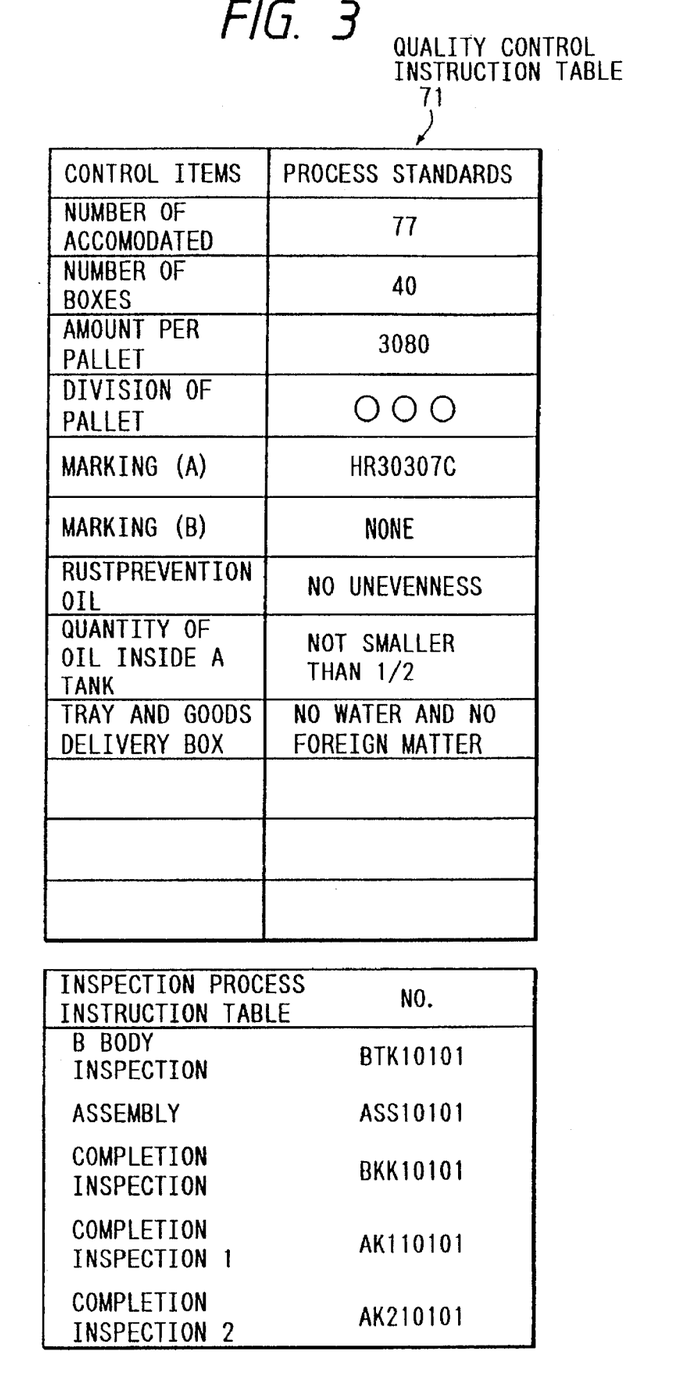
FIG. 3 is a diagram for explaining an example of the quality control instruction table.

The computer aided quality control system portion 12 reads the product number such as the name number or the like of the bearing determined in the computer aided design system portion 11 and stored in the manufacturing drawing control file 14. Then, the computer aided quality control system portion 12 reads out the quality control data base (or library), which previously stores the information concerning the standards (e.g., factory standards), on the basis of this name number. The readout information is edited into the form of the quality control instruction table 71 which contains process standards corresponding to control items such as the number of the products to be accommodated, in each box, the number of boxes, the amount per pallet, and the like, required for quality control, and which further contains an inspection work instruction table. Thus, the quality control instruction table 71 generated as shown in FIG. 3 is stored into a quality control file 15.

The production control system portion 13 is supplied with the ordered quantity from a customer, the date of delivery products stock status, user name, products cost, and the like, and stores the supplied data into a manufacture command file 16.

Further, the main information processing apparatus 1 has a data transmission/reception processing portion 17 and a data transmission portion 18. The data transmission/ reception processing portion 17 is arranged so that it transmits the data stored in the manufacturing drawing control file 14 and in the quality control file 15 to the EWS 3 when a transmission request is generated externally or internally, and receives manufacture history data from the EWS 3 and stores the data into a manufacture history file 19. The data transmission portion 18 is arranged to send the data stored in the manufacture command file 16 to the producing system computer 5.

Figure 5:
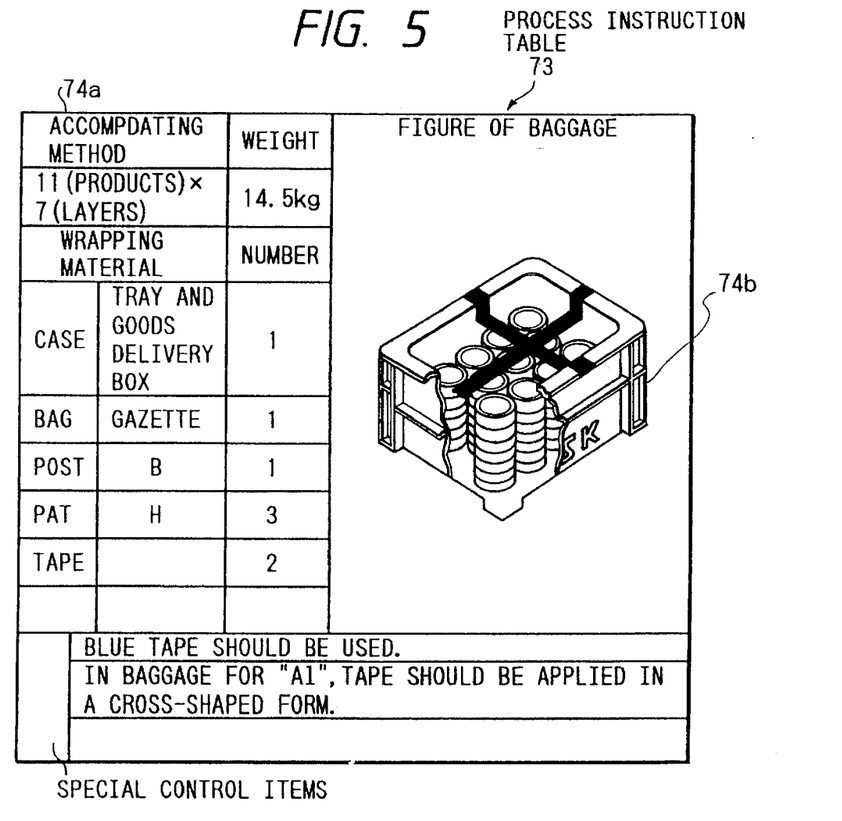
FIG. 5 is a diagram for explaining an example of the process instruction table.
Figure 6:
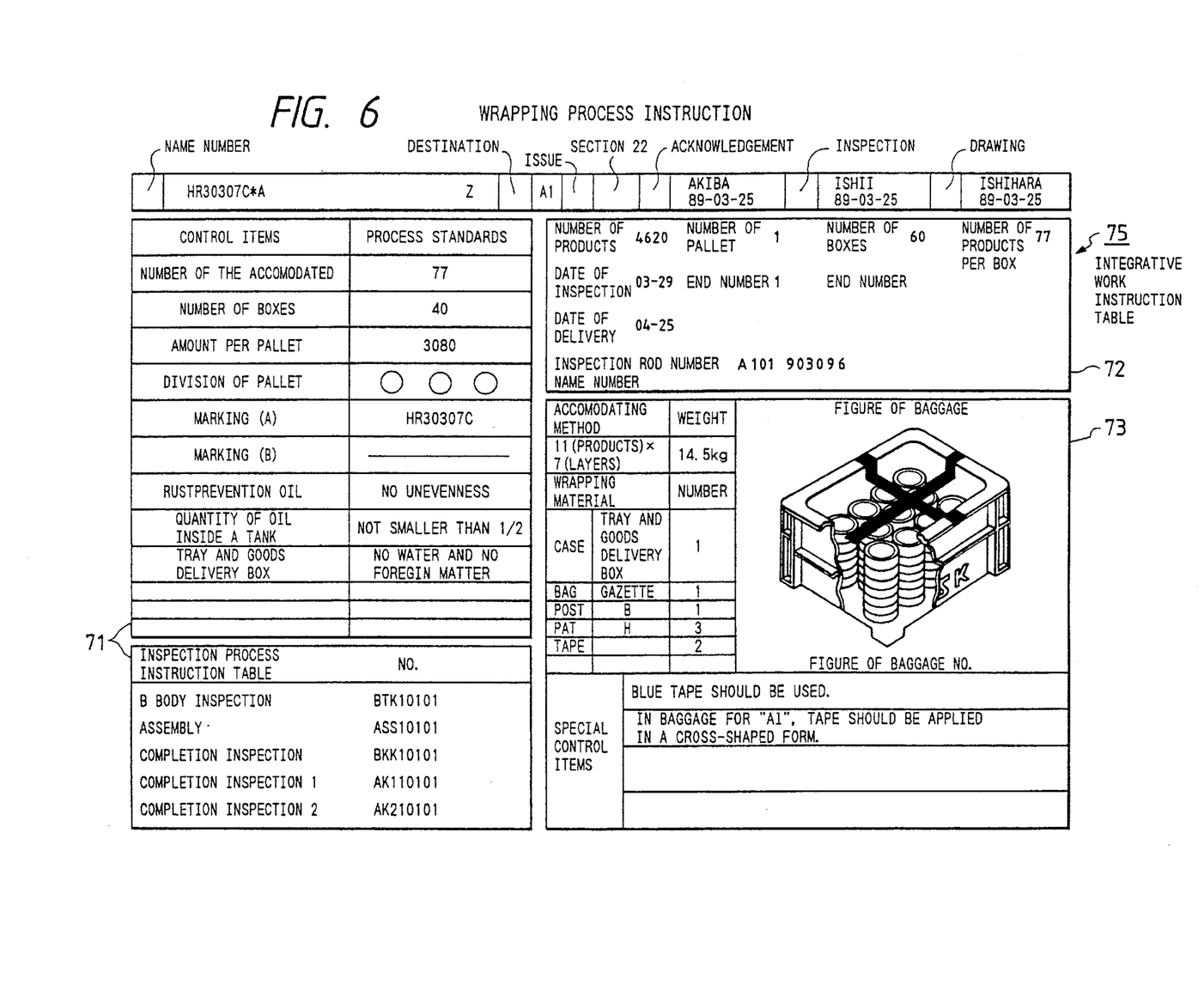
FIG. 6 is a diagram for explaining an example of the integrative work instruction table.

The EWS 3 includes: a data transmission/reception processing portion 33 which receives various data sent from the main information processing apparatus 1 and the producing system computer 5, and analyzes the data received from the main information processing apparatus 1 and stores the analyzed data into a manufacturing drawing file 31 and an instruction file 32; an image scanner 34 for reading hand-written guidance for respective steps including a package form and the like in accordance with "know how on spot" obtained, for example, from a QC circle or the like; an image editing portion 35 for performing editing while displaying the image data read-in through the image scanner 34 and the instruction data stored in the instruction file 32 on a display device 38 to thereby generate, for example, a package process instruction table 73 (as shown in FIG. 5) acting as a process control instruction information means 500 (see FIG. 1); an image file 36 for storing the process instruction table 73 which has been edited in the image editing portion 35; and a data transmission/reception processing portion 37 acting as the production integrative information sending means which integrates the data stored in the files 31, 32, and 36 on the basis of a manufacture instruction table 72 sent from the producing system computer 5 and received in the data transmission/reception portion 33 and on the basis of a preceding process completion report to thereby generate an integrative work instruction table 75 of FIG. 6, and which transmits the thus generated integrative work instruction table 75 to corresponding interactive type intelligent terminals 61 and 62 provided in each producing process. Further, the reference numeral 39 designates a printer connected to the data transmission/reception processing portion 37 so as to print out the integrative work instruction table 75 in accordance with a requirement.

Supplied with the manufacture instruction table 72 (see FIG. 4) from the main information processing apparatus 1, the producing system computer 5 generates a schedule on the basis of the table 72; issues a completion card on which a bar code acting as an identification code is printed by product; issues various slips for giving instructions for carrying out the schedule to a working spot, to a person in charge of a warehouse, to a person in charge of inspection, to a person in charge of transportation, and the like, on the basis of the schedule, the slips including, for example, a working slip for indicating a work, a delivery slip for indicating preparation of materials, jigs, or the like, an Inspection slip for indicating inspection on intermediate or finished products and recording the result of inspection on the slip and a movement slip to be used in movement and delivery of worked materials; sends the manufacture instruction table 72 to the EWS 3 through the communication line 6; and receives, through the EWS 3, feedback information which is the results of execution based on the slips.

Each of the interactive type intelligent terminals 61 and 62 includes a display device 64 such as a CRT display or the like for displaying integrative work instruction information outputted from the EWS 3, a processing device 65 with a keyboard for performing information transfer with the EWS 3 and for controlling display of the display device 64, and a bar code reader 66 for reading the bar code of a completion card which is moved with a product, so that the terminal displays predetermined guidance information for performing verification of each working slip in an entered production process and confirmation of the number of necessary working slips on the basis of the bar code of the completion card read by the bar code reader 66 and the identification number entered, for example, through the keyboard. When entry of predetermined items is normally performed on the basis of the guidance information, the integrative work instruction information stored in advance is displayed in the display device 64, and the identification code of the working process and data required for execution work are entered through the bar code reader 66 or the keyboard upon completion of the works so that the manufacture history such as the confirmation work, the execution work, and the like is sent to the main information processing apparatus 1 through the EWS 3 and stored in the manufacture history file 19 of the apparatus 1.

Both key words, such as an identification number for a worker, and the corresponding process number, and the code data of a completion card (manufacture instruction table 72) delivered to its working spot while being attached to a product, are input to the information output means. The display device displays question messages of the interactive guidance information representing a kind of the work to be performed, a working spot where the work is performed, and the worker charged with the work. The interactive type guidance information is stored in a memory mounted in the printer 39 for the production integrative information or the memories of the processing devices 65 acting as interactive type intelligent terminals. When both the key word and the code data are input to the interactive type intelligent terminals 65, the guidance information are displayed by the display device 64. The interactive type guidance information represents the question messages to enquire the contents of the completion card, i.e., the name number, number of boxes, lot number, the number of the work instruction slips, and the like (these items are input in the form of code data). Then, the operator verifies, for confirmation, the data described in the completion card with the products transported to the corresponding manufacturing spot, and enters data values (described in the completion card) as the answer to the question messages. If the input value is correct, the products to be worked in the manufacturing spot, the completion card and the working slips which are prepared for the products are provided with its correct combination. In other words, such an unwanted situation that improper products are transported and the erroneous work is done is avoided, so that a first check is finished.

Only when the first check is correct, the display device 64 displays the contents of the integrative work instruction table 75 necessary for the work in the manufacturing spot, and presents them to the worker, so that a second check is finished.

Thus, only when the completion card, the work slips, and the like match the products in the first check, the integrative work instruction information (document) necessary for the work are displayed by the display device. Therefore, there never occurs mistaken work caused by the mismatching of the products and the integrative work instruction information. When the design of the products is altered, the integrative work instruction information is updated. For example, manufacturing drawing information and the quality control information are updated. The updated information is stored into, the memory of the printer 39 of the production integrative information generation means 3 or the memory of the display device 64. Thus, as the result of the first check, the correct integrative work instruction information is always transmitted in an integrated form. There is successfully eliminated erroneous works due to the missing of information to be transmitted, transmission of erroneous information, and the like.

Next, the operation of the above embodiment will be described with respect to the bearing package process byway of example. First, the computer aided design system portion 11 of the main information processing apparatus 1 receives use conditions such as a radial load, an axial load, a rotational speed, and the like as well as bearing selection conditions, for example, size conditions such as a shaft diameter, a housing diameter, and the like; determines the form and arrangement of the bearing on the basis of the use conditions, the use environment, and the like; performs predetermined application calculations corresponding to the form and arrangement of the bearing determined on the basis of the use conditions; determines the name number of the bearing in consideration of special use conditions such as accuracy of the bearing and the like; retrieves drawing data of the determined bearing name number from a data base to read the drawing data; and stores the drawing data together with various dimensional data, as the manufacturing drawing information, into the manufacturing drawing control file 14.

Next, the quality control system portion 12 forms the quality control instruction table in which process standards for preset control items are set on the basis of the determined bearing name number; forms the inspection work instruction table; and stores both the instruction tables in the quality control file 15 as the quality control instruction table. Here, in the case of using package of the bearing as an example, the relation between the control items and the process standards is set as follows. That is, as shown in FIG. 3, the number of the accommodated is set to "77"; the number of boxes, "40"; the amount per palette, "3080"; the palette classification, "○ ○ ○"; the outer-rim side marking (A), "HR30307C"; the inner-rim side marking, "NONE"; the rust prevention oil, "no unevenness in adhesion"; the quantity of oil inside a tank, "not smaller than ½": the tray and goods delivery box, "no water and no foreign matter"; and so on.

Thus, the manufacturing drawing information and quality control instruction table corresponding to the product are stored in the manufacturing drawing control file 14 and the quality control file 15 respectively so as to be utilized as the data base.

Then, the thus formed manufacturing drawing information and quality control instruction table are sent to the EWS 3 through the data transmission portion 17 and the high-speed digital communication line 2 and respectively stored in the manufacturing drawing file 31 and the instruction file 32 through the data transmission portion 33.

Upon reception of the quantity of received order, the data of delivery, and the like, of the product in this state, the production control system portion 13 of the main information processing apparatus 1 forms manufacturing commands such as the product code, the quantity of received order, the data of delivery, and the like; stores the manufacturing commands in the manufacturing command file 16; and sends the manufacturing commands to the producing system computer 5 provided in a factory through the data transmission portion 18 and the high-speed digital communication line 4.

Figure 4:
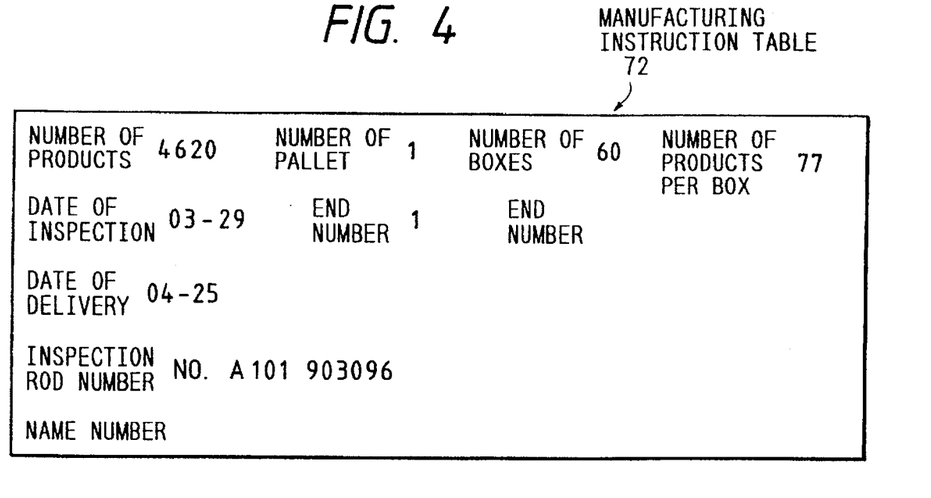
FIG. 4 is a diagram for explaining an example of the manufacture instruction table.

Upon reception of the manufacture command, the producing system computer 5 stores the command in an internal memory; forms the manufacture instruction table 72 in which the number of products, the number of pallets, the number of boxes, the number of products per box, the fraction, the inspection date, the take-in date, the inspection lot number, and the name number for drawing parts are recorded on the basis of the manufacture command; transmits the manufacture instruction table 72 to the EWS 3 through the internal house line 6; and issues a completion card to be added to the product and various work slips.

Upon reception of the quality control instruction table 71, the EWS 3 stores the quality control instruction table into the instruction file 32 and makes a display device 38 display the quality control instruction table. On the basis of the display, an operator uses the image scanner 34 to reads in a handwritten guidance of FIG. 5 in which characters 74a and pictures 74b for each process such as a package form or the like in accordance with "know how on spot" obtained in a QC circle in the factory; incorporates the read image data into a predetermined region of the process instruction table 75 so as to complete the process instruction table 73; and stores the thus completed process instruction table 73 in the image storage file 36. Next, the operator searches the instruction file 32 and the image storage file 36 on the basis of the name number by using the data transmission/reception processing portion 37; forms the integrative work instruction table 75 for instructing manufacture on the spot as shown in FIG. 6; transmits the integrative work instruction table 75 to the intelligent terminals 61 and 62 on the corresponding spot; stores the integrative work instruction table 75 in a built-in memory and a hard disk of each of the terminals.

The image data indicates know how data required when human (workers) deals in a production process, such as assembling, inspecting, sealing, stitching, packaging and the like. The image data is provided by characters and graphical figures concerning the procedures, methods, work items, rules for quality guarantee to be observed, know how and the like. For example, there are the following items:

A) visual inspection of seams after the stitching work is performed with strings when a seat belt for a vehicle is wound to a retractor and the belt is firmly attached to a body mounting piece;

B) check if the grease filter normally operates when grease is introduced into the bearing, such as air-containing (visual inspection), grease feeding pressure, accuracy introducing on a cage of the bearing (visual inspection);

C) measurement without the bearing; and

D) holding appearance of the cage (visual inspection).

On the spot, when the corresponding product is delivered from the preceding process, first, an identification code of a worker is entered, for example, through a ten-key, and the bar code of a completion card added to the product is entered through the bar code reader. By this, predetermined guidance information for performing verification of various work slips in the producing process and for performing confirmation of the number of necessary work slips is displayed. When entry of predetermined items is normally performed on the basis of the guidance information, the integrative work instruction table 75 stored in advance is displayed on the display device 64, and upon completion of the work the identification code of the work process and data required for carrying out the work are entered through the bar code reader 66 or the ten-key so that the manufacture history such as the confirmation work, the execution work, and the like are transmitted to the main information processing apparatus 1 through the EWS 3 so as to be stored in the manufacture history file 19 of the apparatus 1.

As described above, the main information processing apparatus 1 includes the manufacturing history file 19 for storing the work history in manufacturing spots and a manufacturing history output device capable of displaying the history information at will. The manufacturing history information is stored through the production integrative information generation means from the intelligent terminals 61 and 62 arranged at spots. Accordingly, if a claim on quality is made by a client, the operator analyzes the cause for the claim and can quickly deal with the claim.

Thus, the manufacturing drawing information, quality control information, and production control information formed in the main information processing apparatus 1 are transmitted to the EWS 3 provided in a factory and image data of the handwritten instruction including "know how on spot" and the like are added to the foregoing information to thereby form the integrative work instruction table. Therefore, no error is generated in transfer, transmission or the like, of the work instruction table. Further, since verification of the completion card added to the product and the work slips as well as the confirmation of the number of the necessary work slips are performed on the basis of the guidance information on the spot so that the integrative work instruction table 74 is displayed, erroneous work due to disagreement between the product and instruction information thereof can be surely prevented from occurring to thereby make it possible to effectively perform quality guarantee. Moreover, a series work for a worker in a spot is stored, as the manufacture history, in the manufacture history file 19 In the main information processing apparatus 1 and therefore the progressive condition of the product can be clearly grasped. Furthermore, even if a trouble is unfortunately caused, a countermeasure can be performed rapidly by searching the manufacture history file Although the case where the computer aided design system, the quality control system, and the production control system are processed by means of the main information processing apparatus 1 has been described in the foregoing embodiment, those systems may be processed with processors provided separately from each other.

Further, although the case where the main information processing apparatus 1 and the EWS 3 are connected to each other through the high-speed digital communication line 2 has been described in the foregoing embodiment, the present invention is not limited to this. Alternatively, any other wire or wireless data communication system may be used.

Moreover, although the case where the intelligent terminals 51 and 62 are provided on the producing spot has been described in the foregoing embodiment, any other terminals may be used so long as those terminals are interactive type terminals including display devices or printers respectively.

Furthermore, although the case where the bar code reader 66 is provided in each of the intelligent terminal 61 and 62 has been described in the foregoing embodiment, any other information input means such as a card reader for reading a magnetic card on which information is magnetically recorded, an IC card reader for reading an IC card, or the like, may be used in place of the bar code reader 66.

As described above, the production information processing system according to the present invention comprises: a manufacturing drawing information generation means for generating manufacturing drawing information of products; a quality control information instruction means for generating quality control instruction information on the basis of the manufacturing drawing information from the manufacturing drawing information generation means; a production control information generation means for generating production control information including for example the number of products; a production integrative information generation means supplied with the manufacturing drawing information from the manufacturing drawing information generation means, the quality control instruction information from the quality control information instruction means and the production control information from the production control information generation means for generating production integrative information further more adding process control instruction information including image data to the quality control instruction information; and a production integrative information send-out means for sending-out the production integrative information from the production integrative information generation means to an information output means provided in a production line. Accordingly, it is possible to obtain such effects that manufacturing information, selling information, and technique information can be timely referred to on the manufacturing spot and the process control instruction information including the handwritten instruction such as "know how on spot" or the like can be integrated, work instruction information suitable for the producing spot can be correctly transmitted and the progressive condition of a product can be properly grasped so that integrative control in the case of manufacturing the products can be efficiently performed.

Moreover, the production information processing system according to the present invention can automatically revise, edit, and form the manufacturing drawing information and the quality control instruction information in an integral form. With such a system, even if the product design is altered, the integrative work instruction information can be transmitted exactly without erroneous because of integrating the quality control information. Further, the first check is performed for checking if the product arrival at a manufacturing step is coincident with that associated with a completion card and work instruction slips. Only when the first check is passed, the integrative work instruction table is displayed. An operator can see the display and checks if there are present the missing of information to be transmitted, transmission of erroneous information, and the like. Particularly, the works made by workers are frequently based on know how on the works. The know how data can be integrated into the data formed by the CAD. Accordingly, the present invention can prevent missing of the work, dispersion of the know how, and enables the know how to be transferred to other persons. A variation of the finishing of the work is minimized. Thus, the working procedures may be standardized. Accordingly, the present invention is useful particularly for standardizing the works by workers, such as packaging, inspection, and assembling. Thus, the present invention provides a system for preventing in advance claims on quality by clients outside the company.

While the present invention has been described above with respect to a single preferred embodiment thereof, it should of course be understood that the present invention should not be limited only to this embodiment but various change or modification may be made without departure from the scope of the present invention as defined by the appended claims.

What is claimed is:

1. A production information processing system comprising:
   a main information processing apparatus comprising:
   a manufacturing drawing information generation means for generating a manufacturing drawing information of products;
   a quality control information instruction means for generating a quality control instruction information in accordance with the manufacturing drawing information;
   a production system portion for generating a manufacturing instruction in accordance with a customer information including an ordered quantity and a date of delivery;
   a production control information generation means including a producing system computer for generating a manufacturing schedule in a working spot in response to the manufacturing instruction, and for generating at least one slid which contains a manufacturing instruction information and is attached to each of the products in accordance with the manufacturing schedule, the at least one slip comprising one of:
   a completion card with a printed a bar code for identifying the products;
   a movement slip for indicating movement and delivery of materials worked in the working spot;
   a delivery slip for indicating preparation of the materials and jigs in the working spot; and
   an inspection slip for indicating inspection on intermediate or finished products and for recording a result of the inspection, wherein the main information processing apparatus has a manufacture history file which stores a manufacture history of the working spot; and
   a factory information processing apparatus comprising:
   means for generating an integrative transmission/reception information which is integrated with the manufacturing drawing information, the quality control instruction information, and the manufacturing instruction information;
   means for bidirectionally communicating the manufacture history to the main information processing apparatus;
   an interactive type terminal installed at the working spot; and
   means for generating an integrative work instruction information by adding an image information which comprises a character and a graphic provided in the working spot by the interactive type terminal, to the integrative transmission/reception information, wherein the integrative work instruction information is transmitted to the interactive type terminal and shared with the manufacture history.

2. The production information processing system of claim 1, wherein the image information comprises procedures, methods, work items, rules, and know how provided by a worker in the working spots for the work including a production process of assembling, inspecting, sealing, stitching, and packaging.

3. A production information processing system comprising:
   a main information processing apparatus comprising:
   a manufacturing drawing information generation means for generating a manufacturing drawing information of products;
   a quality control information instruction means for generating a quality control instruction information in accordance with the manufacturing drawing information;
   a production system portion for generating a manufacturing instruction in accordance with a customer information including an ordered quantity and a date of delivery;
   a production control information generation means including a producing system computer for generating a manufacturing schedule in a working spot in response to the manufacturing instruction, and for generating at least one slip which contains a manufacturing instruction information and is attached to each of the products in accordance with the manufacturing schedule, the at least one slip comprising one of:
  a completion card with a printed a bar code for identifying the products;
  a movement slip for indicating movement and delivery of materials worked in the working spot;
  a delivery slip for indicating preparation of the materials and jigs in the working spot; and
  an inspection slip for indicating inspection on intermediate or finished products and for recording a result of the inspection, wherein the main information processing apparatus has a manufacture history file which stores a manufacture history of the working spot; and
a factory information processing apparatus comprising:
  means for generating an integrative transmission/reception information which is integrated with the manufacturing drawing information, the quality control instruction information, and the manufacturing instruction information;
  means for bidirectionally communicating the manufacture history to the main information processing apparatus;
  an interactive type intelligent terminal installed at the working spot; and
  means for generating an integrative work instruction information by adding an image information provided in the working spot by the interactive type intelligent terminal, to the integrative transmission/reception information,
the interactive type intelligent terminal comprising:
a display device for displaying the integrative work instruction information;
a terminal processing device for selecting the integrative work instruction information with a keyboard for controlling the display device; and
a code reader for reading code data of the slip which is moved with each of the products,
wherein when the interactive type intelligent terminal receives key words inputted by the keyboard and the code data of the slip attached to each of the products and delivered to the working spot, from one of the terminal processing device and the code reader, the display device displays an interactive type guidance information of the integrative work instruction information for enquiring necessary conditions for the work, and
wherein the interactive type intelligent terminal is so adapted that the display device displays the integrative work instruction information when all the necessary conditions are satisfied.

4. The production information processing system of claim 3, wherein the necessary conditions comprise a verification of entry items, a verification of the slips and a confirmation of the number of the slips.

5. A production information processing system comprising:
a main information processing apparatus comprising:
  a manufacturing drawing information generation means for generating a manufacturing drawing information of products, the manufacturing drawing information generation means including
  a dimension calculating means for calculating dimension calculation data of a product to be manufactured in order to determine a name number in accordance with product use condition data of the product,
  a figure drawing data base for retrieving manufacturing drawing data of the product in accordance with the name number, and
  a manufacturing drawing control file for storing the manufacturing drawing information corresponding to the product use condition data, the dimension calculation data, and the manufacturing drawing data, wherein the manufacturing drawing control file is stored in the figure drawing data base;
  a quality control information instruction means for generating a quality control instruction information in accordance with the manufacturing drawing information, the quality control information instruction means including
  a quality control data base for retrieving quality control instruction data of the product in accordance with the name number, and
  a quality control file for storing the quality control instruction information corresponding to the quality control instruction data, wherein the quality control file is stored to the quality control data base;
a production system portion for generating a manufacturing instruction in accordance with a customer information including an ordered quantity and a date of delivery;
a production control information generation means including a producing system computer for generating a manufacturing schedule in a working spot in response to the manufacturing instruction, and for generating at least one slip which contains a manufacturing instruction information and is attached to each of the products in accordance with the manufacturing schedule, the at least one slip comprising one of:
  a completion card with a printed a bar code for identifying the products;
  a movement slip for indicating movement and delivery of materials worked in the working spot;
  a delivery slip for indicating preparation of the materials and jigs in the working spot; and
  an inspection slip for indicating inspection on intermediate or finished products end for recording a result of the inspection, wherein the main information processing apparatus has a manufacture history file which stores a manufacture history of the working spot; and
a factory information processing apparatus comprising:
  means for generating an integrative transmission/reception information which is integrated with the manufacturing drawing information, the quality control instruction information, and the manufacturing instruction information;
  means for bidirectionally communicating the manufacture history to the main information processing apparatus;
  an interactive type terminal installed at the working spot; and
  means for generating an integrative work instruction information by adding an image information provided in the working spot by the interactive type intelligent terminal, to the integrative transmission/reception information.

* * * * *